United States Patent [19]

Yakou

[11] Patent Number: 5,050,919
[45] Date of Patent: Sep. 24, 1991

[54] HAND APPARATUS FOR HOLDING ARTICLE

[75] Inventor: Takeshi Yakou, Tokyo, Japan

[73] Assignee: Canon Kabushiki Kaisha, Tokyo, Japan

[21] Appl. No.: 564,702

[22] Filed: Aug. 8, 1990

Related U.S. Application Data

[63] Continuation of Ser. No. 265,756, Nov. 1, 1988, abandoned.

[30] Foreign Application Priority Data

Nov. 6, 1987 [JP] Japan .......................... 62-169086[U]

[51] Int. Cl.$^5$ .......................... B25J 15/06; B66C 1/42
[52] U.S. Cl. ...................................... 294/2; 294/64.1; 294/119.1; 901/39; 901/40
[58] Field of Search .............. 294/2, 64.1, 87.1, 119.1; 901/31, 32, 39, 40; 29/743; 269/24, 27, 32, 34

[56] References Cited

U.S. PATENT DOCUMENTS

| | | | |
|---|---|---|---|
| 4,609,220 | 9/1986 | Scott | 294/87.1 |
| 4,705,311 | 11/1987 | Ragard | 294/2 |
| 4,772,170 | 9/1988 | Oldfield | 294/2 X |

FOREIGN PATENT DOCUMENTS

| | | | |
|---|---|---|---|
| 295847 | 12/1988 | European Pat. Off. | 294/64.1 |
| 62-181839 | 8/1962 | Japan | |
| 46-46819 | 2/1973 | Japan | |
| 51-6939 | 3/1976 | Japan | |
| 55-150989 | 11/1980 | Japan | |
| 61-50687 | 4/1986 | Japan | |
| 61-256004 | 11/1986 | Japan | |
| 61-56074 | 12/1986 | Japan | |
| 62-18317 | 4/1987 | Japan | |
| 2087347 | 5/1982 | United Kingdom | 29/743 |

Primary Examiner—Margaret A. Focarino
Assistant Examiner—Dean J. Kramer
Attorney, Agent, or Firm—Fitzpatrick, Cella, Harper & Scinto

[57] ABSTRACT

An article holding hand apparatus of this invention grips a plurality of types of articles having different gripping modes. The apparatus includes at least two casings with a varying distance therebetween, first driving mechanisms for moving the casings to vary the distance therebetween, and a first holding mechanism attached to each casing and having at least two first finger members. The first holding mechanism opens and closes the first finger members to clamp a first article by movement of the casings through the first driving mechanism. The apparatus also includes a second holding mechanism, attached to each casing, for holding a second article, the second holding mechanism having second finger members slidably guided by the first finger members, with the distal end of each second finger member serving as a holding portion for holding the second article, and second driving mechanisms, housed in the casings, for sliding the second finger members.

10 Claims, 8 Drawing Sheets

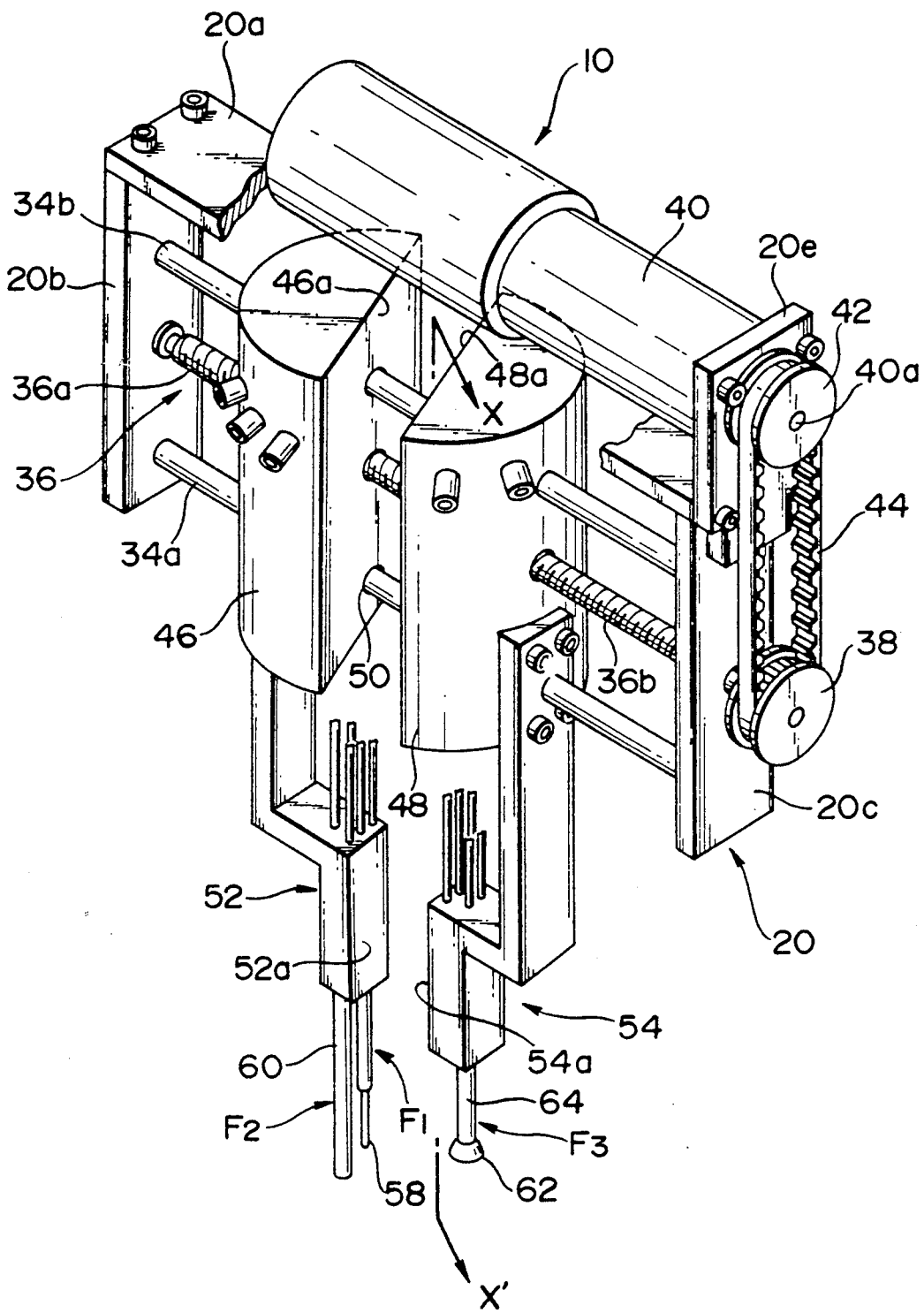
F I G. 2

HAND APPARATUS FOR HOLDING ARTICLE

This application is a continuation of application Ser. No. 265,756 filed Nov. 1, 1988, now abandoned.

BACKGROUND OF THE INVENTION

The present invention relates to a hand apparatus for an article assembly robot or a hand apparatus for gripping an article used for an article conveying system.

As a conventional hand apparatus attached to a robot, an apparatus comprising fingers for gripping only one kind of article is known.

As a hand apparatus comprising a function of adjusting an article to a correct gripping position in order to reliably hold an article with fingers, Japanese Patent Laid-Open (Kokai) No. 61-256004 is known.

Japanese Patent Publication No. 62-18317 discloses an arrangement having a hand body, and a pair of pawls, one-end portions of which are attached to the hand body, and which are moved by an actuator relative to the hand body so as to grip an article, wherein a suction hole for chucking an article is formed in one pawl, and the suction hole is coupled to a vacuum source.

Furthermore, Japanese Patent Publication No. 51-6939 discloses an apparatus having a plurality of pawls, which are driven by a hydraulic cylinder, in order to grip objects to be gripped, which have different shapes.

However, in these conventional hand apparatuses, a gripping apparatus which has a function of conveying a plurality of kinds of articles to one assembly line, and sequentially gripping the articles to assemble them, cannot be met.

More specifically, as shown in FIG. 8, in an assembly process of an aperture unit used in a camera, the above-mentioned gripping apparatus is required. An aperture unit shown in FIG. 8 is constituted by an aperture support ring (a), aperture blades (b), and an operation ring (c) for pivoting the aperture blades (b). The aperture support ring (a) and the operation ring (c) are molded and formed of a metal or a relatively hard plastic material. Therefore, the aperture ring (a) and the operation ring (c) can be pressed and gripped at their side surfaces by finger members.

On the other hand, each aperture blade (b) is normally formed of a metal. The thickness of each aperture blade (b) is very small, and is about 1/100 mm. The aperture blades (b) are required to have strict flatness. Upon rotation of the aperture blade (b) itself and a stack of the aperture blades (b), bending and warp of blades are strictly regulated. For this reason, the side surfaces of the aperture blades (b) cannot be pressed and gripped since it may cause warp or bending of the blades.

In order to automate and unman an assembly of the above-mentioned aperture unit, the aperture support ring (a), the aperture blades (b), and the operation ring (c) are sequentially gripped by a gripping apparatus, and are automatically assembled by an assembly station. However, since these articles must be gripped in different modes, it is difficult to grip these articles by a single gripping apparatus. For this reason, a plurality of types of gripping apparatuses must be prepared in correspondence with the gripping modes, thus posing problems of cost and installation space.

If articles of different gripping modes are to be gripped in one gripping mode, the articles may be damaged by the gripping operation.

In the assembly station, e.g., fingers of an assembly robot, a gripping apparatus is selected and replaced in accordance with a gripping mode of an article. For this reason, the assembly robot must have a finger detaching apparatus between a robot arm and a hand apparatus. As a result, its structure is complicated and prolonged working time is required for replacing fingers, resulting in poor workability.

SUMMARY OF THE INVENTION

The present invention has been made in consideration of the above situation, and has as its main object to provide a gripping apparatus capable of gripping a plurality of articles of different gripping modes without using a plurality of gripping apparatuses.

To attain the above-mentioned main object, according to one aspect of the present invention, there is provided an article holding hand apparatus which grips a plurality of types of articles having different gripping modes. The apparatus comprises at least two casings with a varying distance therebetween; first driving means for moving the casings to vary the distance therebetween; and first holding means for holding a first article, attached to each of the casings and having at least two first finger members. The first holding means opens and closes the first finger members to clamp the first article upon movement of the casings through the first driving means. The apparatus also includes second holding means, attached to each of the casings, for holding a second article, the second holding means having second finger members slidably guided by the first finger members, respectively, and a distal end of each of the second finger members serving as a holding portion for holding the second article; and second driving means, housed in the casings, for sliding the second finger members.

Since a plurality of articles of different gripping modes can be gripped by a single gripping apparatus, a low-cost, space-saving gripping apparatus can be provided for an automatic assembly operation.

It is another object of the present invention to provide a gripping apparatus comprising a plurality of gripping members in accordance with gripping modes of articles to be gripped, and capable of reliably gripping an article in accordance with each gripping mode.

To attain the second object, according to another aspect of the present invention, there is provided an article holding hand apparatus which grips a plurality of types of articles having different gripping modes. The apparatus comprises a pair of casings capable of moving toward and away from each other, each of the casings being formed into a semi-cylindrical shape, and the casings being disposed so that flat surface sides of the semi-cylindrical shapes oppose each other. First driving means slides the casings; article holding means holds an article, with the article holding means having a plurality of pairs of finger members; and second driving means moves and drives the finger members. The second driving means are radially arranged toward the flat surface sides in the two casings. Lastly, coupling means couples the finger members and the second driving means for causing the second driving means to change a holding position of the article.

In this manner, since the gripping apparatus comprises a plurality of gripping members in correspondence with gripping states of articles to be gripped, an assembly precision can be improved, and a holding operation suitable for each part can be executed. As a result, articles can be prevented from being damaged.

It is still another object of the present invention to provide a gripping apparatus which has a plurality of article holding means, and can be rendered compact without complicating its structure.

It is a further object of the present invention to provide a gripping apparatus having an arrangement comprising a plurality of types of holding means, wherein the holding means do not interfere with each other.

To attain the above-mentioned objects, according to a further aspect of the present invention, there is provided an article holding hand apparatus which grips a plurality of types of articles having different gripping modes. The apparatus comprises a pair of casings arranged to be movable along a first axis; and first driving means for moving the casings to be toward and away from each other along the first axis; first holding means comprising first finger members attached to the casings, with the first finger members changing a distance therebetween upon movement of the casings by the first driving means to clamp and grip a first article. Second holding means holds a second article, with the second holding means comprising at least a pair of second finger members arranged to be movable along a second axis extending in a direction different from the first axis; and second driving means, housed in the casings, moves the second finger members along the second axis, wherein each of the second finger members has an article holding portion defined below the first finger member, and inserts the article holding portion in an opening formed in the second article to grip the second article.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a partially cutaway perspective view of the arrangement of the hand apparatus shown in FIG. 1;

DETAILED DESCRIPTION OF THE PREFERRED EMBODIMENTS

An arrangement of an embodiment of an article holding hand apparatus according to the present invention will be described in detail below with reference to the accompanying drawings.

Figure 1:
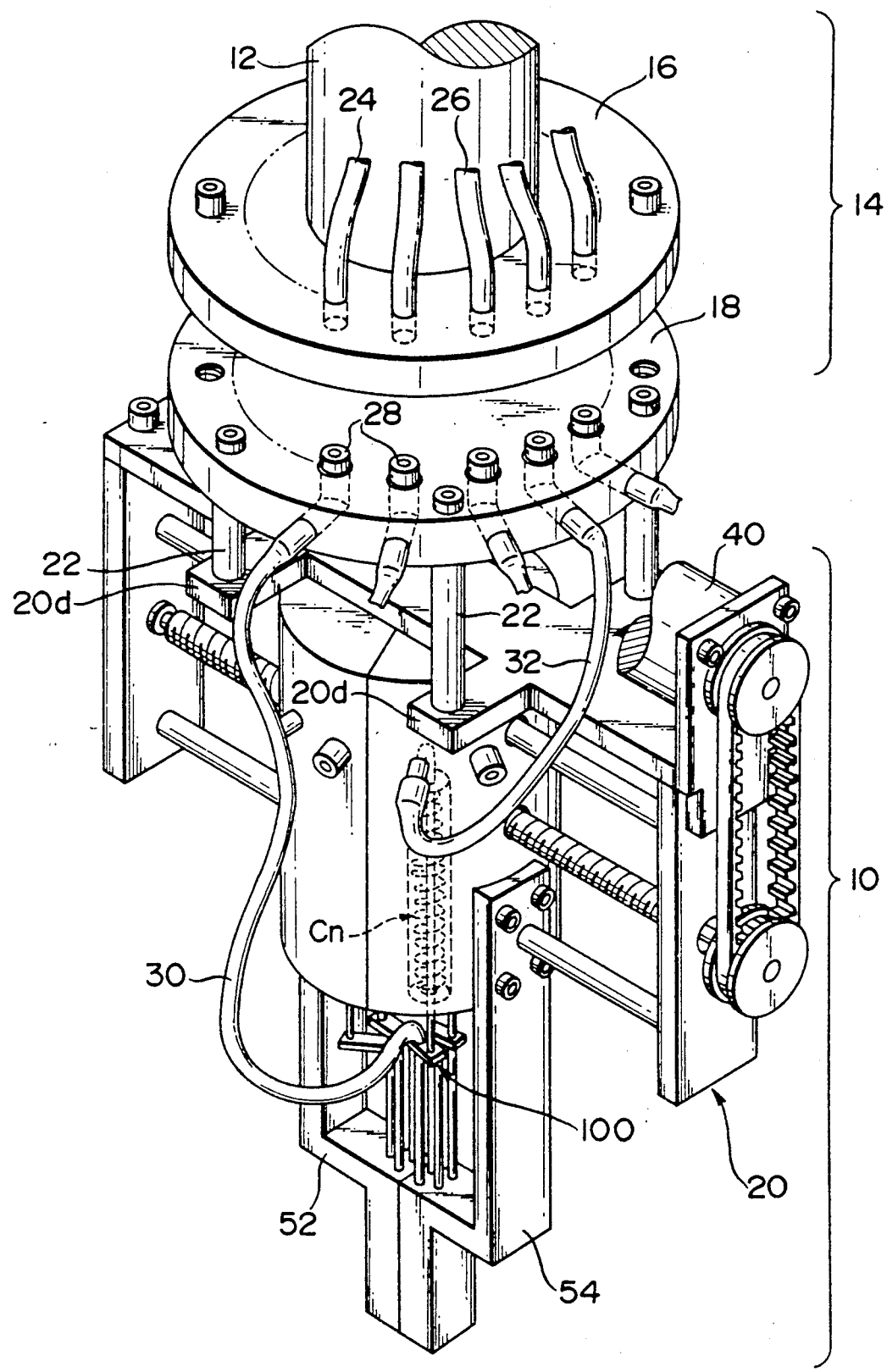
FIG. 1 is a perspective view showing an arrangement of an embodiment of an article holding hand apparatus according to the present invention in a state wherein the apparatus is attached to a robot arm.

FIG. 1 shows a state wherein a hand apparatus 10 according to an embodiment of the present invention is mounted on a hand mounting portion 14 provided to the distal end of a robot arm 12. In FIG. 1, a pneumatic pressure distributing plate 16 is fixed to one end (distal end) of the robot arm 12. The hand apparatus 10 is fixed on a pneumatic pressure relay plate 18, which is mounted on the pneumatic pressure distributing plate 16 to be aligned therewith.

The hand apparatus 10 comprises, as a base, a base portion 20, having a shape like a trough, for fixing the pneumatic pressure relay plate 18. The base portion 20 is located below the pneumatic pressure relay plate 18, and has a lower opening. Four mounting projections 20d integrally extend sideways from a top plate 20a for defining an upper segment of the base portion 20, i.e., a member opposing the pneumatic pressure relay plate 18. The hand apparatus 10 is fixed to the robot arm 12 by fixing the mounting projections 20d to the lower surface of the pneumatic pressure relay plate 18 through spacers 22 by screws.

Eight vacuum pressure pipes 24 and 10 pneumatic pressure pipes 26, which are substantially concentrically arranged, are connected to the pneumatic pressure distributing plate 16. One end of each of these pipes 24 and 26 is open at the same level as the bottom surface of the pneumatic pressure distributing plate 16, and the other end is connected to a vacuum or pneumatic pressure source (not shown). L-shaped pipes 28 are embedded in the pneumatic pressure relay plate 18, to which the pneumatic pressure distributing plate 16 is mounted to be aligned therewith, at positions vertically corresponding to the vacuum pressure pipes 24 and the pneumatic pressure pipes 26.

The upper end (one end) of each L-shaped pipe 28 slightly projects from the upper surface of the pneumatic pressure relay plate 18. The projecting end portions of the L-shaped pipes 28 are automatically inserted under pressure in the opening portions of the pneumatic pressure distributing plate 16 in a state wherein the pneumatic pressure distributing plate 16 and the pneumatic pressure relay plate 18 are fixed to each other. A seal member or the like for preventing air leakage is provided to the upper end of each L-shaped pipe 28. Note that instead of the L-shaped pipes 28, through holes having the same function as that of the L-shaped pipes may be formed in the solid pneumatic pressure relay plate 18 by mechanical drilling, and pipes may be coupled to both opening portions.

The other end of each L-shaped pipe 28 extends outwardly in the radial direction of the pneumatic pressure relay plate 18 so as to project from the outer circumferential surface of the plate 18. One-end portions of flexible vacuum tubes 30 and pneumatic pressure tubes 32 are inserted under pressure or inserted in the other projecting end portions of the L-shaped pipes 28 and then subjected to a removal preventive process. The other end of each vacuum tube 30 is connected to a vacuum supply source (not shown) so as to supply a vacuum pressure to a finger assembly 100 (to be described later), and the other end of each pneumatic pressure tube 32 is connected to a compressed pressure supply source (not shown) so as to supply a pneumatic pressure thereto.

As a control means for controlling supply of the vacuum pressure and pneumatic pressure, electromagnetic valves (not shown) arranged between the vacuum supply source and the vacuum pressure pipes 24 and between the compressed pressure supply source and the pneumatic pressure pipes 26, and a drive/control means (not shown) for driving and controlling these electromagnetic valves are used. A drive/control operation of these electromagnetic valves is performed in association with the operation of the finger assembly 100, and the operation of a servo motor, as will be described later.

FIG. 2 shows the hand apparatus 10 shown in FIG. 1. In FIG. 2, the base portion 20 of the hand apparatus 10 is integrally constituted by the above-mentioned top plate 20a, a left side plate 20b extending downward from the left end of the top plate 20a, a right side plate 20c extending downward from the right end of the top plate 20a, and a motor mounting plate 20e mounted on the upper portion of the right side plate 20c.

The left and right side plates 20b and 20c are respectively fixed to the left and right ends of the top plate 20a by screws, and extend vertically downward with respect to the two ends of the top plate 20a. The motor mounting plate 20e is fixed on the right side plate 20c by screws, and extends upright on the top plate 20c. A pair of parallel guide shafts 34a and 34b are arranged between the left and right side plates 20b and 20c in a fixed (rotation disable) state.

A screw shaft 36 is axially supported between these guide shafts 34a and 34b to be rotatable through a bearing (not shown). The screw shaft 36 is arranged to be located at substantially the middle of the two guide shafts 34a and 34b. The guide shafts 34a and 34b and the screw shaft 36 are parallel to each other, and support a cylinder casing (to be described later) to be movable in a horizontal direction. The other end of the screw shaft 36 projects outwardly through the right side plate 20c, and a pulley 38 is coaxially fixed thereto.

A servo motor 40 controlled and driven by a control/drive means (not shown) is mounted on the motor mounting plate 20e. A motor pulley 42 is coaxially fixed to an output shaft 40a of the servo motor 40. A toothed belt 44 is looped between the pulleys 38 and 42 at a predetermined tension. In this manner, the drive force of the servo motor 40 is transmitted to the screw shaft 36 through the belt 44 and the pulleys 38 and 42, thus rotating the screw shaft 36.

Left and right cylinder casings 46 and 48 are threadably engaged with the screw shaft 36. The left and right cylinder casings 46 and 48 are guided and supported by the pair of guide shafts 34a and 34b to be slidable in the horizontal direction through a bearing 50.

The screw shaft 36 comprises right and left threaded portions 36a and 36b corresponding to its right and left half portions having its central portion as a boundary. The left and right cylinder casings 46 and 48 respectively comprise female threaded portions 46a and 46b which are respectively threadably engaged with the right and left threaded portions 36a and 36b. In this manner, upon left rotation (counterclockwise rotation) of the screw shaft 36, the left and right cylinder casings 46 and 48 are moved to approach each other. Upon right rotation (clockwise rotation) of the screw shaft 36, the left and right cylinder casings 46 and 48 are moved to be separated from each other.

The left and right cylinder casings 46 and 48 constitute a columnar body when they are assembled, as shown in FIG. 1. The left and right cylinder casings 46 and 48 are respectively formed of hollow bodies which respectively have opposing end faces (flat surface portions) 46a and 48a corresponding to upright planes which are inclined through a predetermined angle with respect to the extending direction of the screw shaft 36 in a separated state.

Left and right angle members 52 and 54 are respectively fixed to lower outer peripheral portions of the left and right cylinder casings 46 and 48 to be loosely fitted on the guide shaft 34b. These left and right angle members 52 and 54 have stiffness high enough to withstand a gripping operation (to be described later). A flat surface 52a of the left angle member 52 and a flat surface 54a of the right angle member 54 have a positional relationship in that they are in substantial contact with each other in a state wherein the flat surface portion 46a of the left cylinder casing 46 is in contact with the flat surface portion 48a of the right cylinder casing 48 (i.e., a state illustrated in FIG. 1).

Five guide holes 56 for respectively guiding five cylinder pistons $P_n$ (to be described later) are vertically formed in each of the left and right angle members 52 and 54 by mechanical machining or in a state wherein guide members are inserted therein under pressure. Three types of fingers $F_1$, $F_2$, and $F_3$ are supported on the cylinder casings 46 and 48 in correspondence with each other so as to be vertically slidable.

These three types of fingers $F_n$ have three kinds of functions, that is, (1) gripping of small parts; (2), chucking of small parts; and (3) chucking of middle-size parts. The cylinder casings 46 and 48 comprise a single pin 58 for the function (1), two suction pipes 60 for the function (2), and two suction pipes 64 for the function (3) having suction pads 62 at their lower ends.

An arrangement for vertically sliding the fingers $F_n$ as a finger unit will be described below with reference to FIG. 3.

Figure 3:
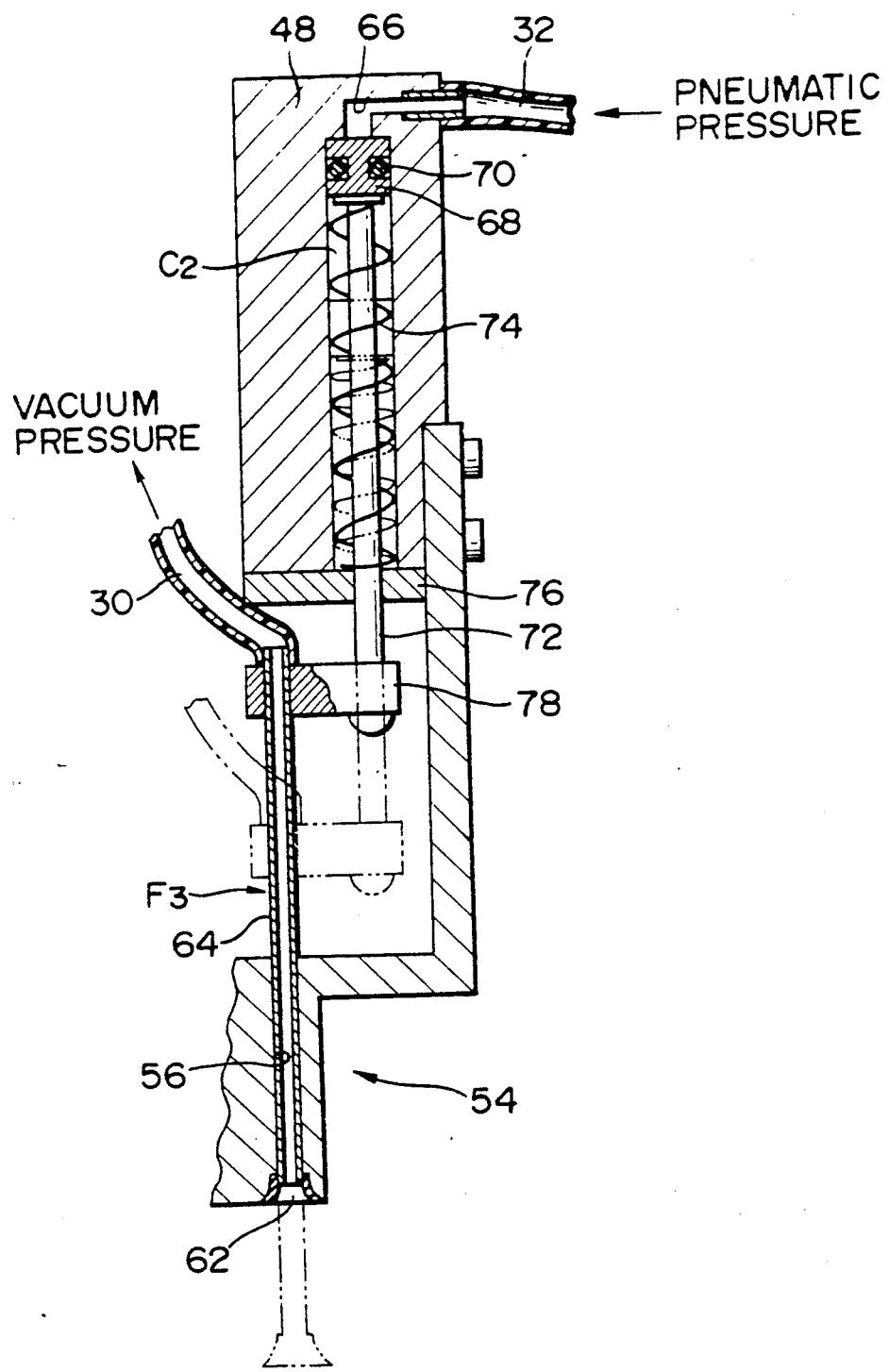
FIG. 3 is a sectional view of the hand apparatus taken along a line X—X' in FIG. 2.

In FIG. 3, five cylinders $C_n$ (in an illustrated state, a cylinder $C_2$ corresponding to the finger $F_2$ is shown for the sake of illustrative convenience) are substantially concentrically provided to each of the left and right cylinder casings 46 and 48 by mechanical machining or by attaching and fixing cylinder assemblies.

Small-diameter through hole portions 66 communicate with and are connected to the upper end portions of the cylinders $C_n$. Mouthpieces are attached to the outer end portions of lateral holes communicating with the through hole portions 66. A pneumatic pressure tube 32 for supplying the compressed air is coupled to and communicates with each mouthpiece to communicate with the corresponding cylinder $C_n$. When the cylinder assemblies are used, L-shaped pipes are arranged as described above, so that the pneumatic pipes 32 can be connected thereto.

The lower end portion of each cylinder $C_n$ has an opening having the same diameter as that of the cylinder. A corresponding piston 68 is inserted in this opening portion. A groove is formed in the outer peripheral portion of each piston 68 along its circumferential direction, and a seal member 70 for preventing air leakage is fitted in the groove to be in sliding contact with the inner peripheral surface of the corresponding cylinder $C_n$.

A piston rod 72 extending downward is fixed to the central portion of the bottom surface of each piston 68. A return spring 74 comprising a compression coil spring is loosely fitted on the outer periphery of a portion of the piston rod 72 in the cylinder $C_n$. The upper end of the return spring 74 is pressed against the bottom surface of the piston 68, and its lower end is regulated by a bottom plate 76 fixed to the corresponding one of the cylinder casings 46 and 48.

In this manner, each return spring 74 is arranged to have a biasing force high enough to press the upper end of the piston 68 against the upper end portion of the corresponding cylinder $C_n$ in a natural state. When a pneumatic pressure is not supplied, each return spring 74 biases the corresponding piston to a position indicated by a solid line in FIG. 3. Meanwhile, when compressed air is supplied inside each cylinder $C_n$ through the pneumatic pressure tube 32, the piston 68 is pressed downward against the biasing force of the return spring 74, and is moved to a position indicated by a broken line in FIG. 3.

The bottom plate 76 is fixed in a state wherein the piston 68, the piston rod 72, and the return spring 74 are set in the corresponding cylinder $C_n$. In this state, a coupling plate 78 which extends radially is fixed to the lower end of each piston rod 72 by screws.

A finger $F_n$ is fixed to one end of each coupling plate 78. The finger $F_n$ is slidably guided in the corresponding guide hole 56 in the corresponding one of the angle members 52 and 54. Note that as shown in FIG. 3, the third finger $F_3$ is constituted by a hollow pipe serving as the suction pipe 64, and a suction pad 62 attached to the lower end (one end) of the hollow pipe. The other end of the finger $F_3$ is connected to the above-mentioned vacuum tube 30, and supplies a vacuum pressure to the suction pad 62. The second finger $F_2$ is constituted by only the suction pipe 60, and the other end thereof is connected to another vacuum tube 30.

An assembly for vertically moving these fingers $F_n$ is slidably guided at two portions, i.e., cylindrical portions constituted by the cylinders $C_n$ and the bottom plates 76, and the guide holes 56 in the corresponding angle members 52 and 54. In particular, precision of sliding movement in the guide holes 56 is important in the function of this embodiment, and the assembly can be guided at only this portion.

Figure 4:
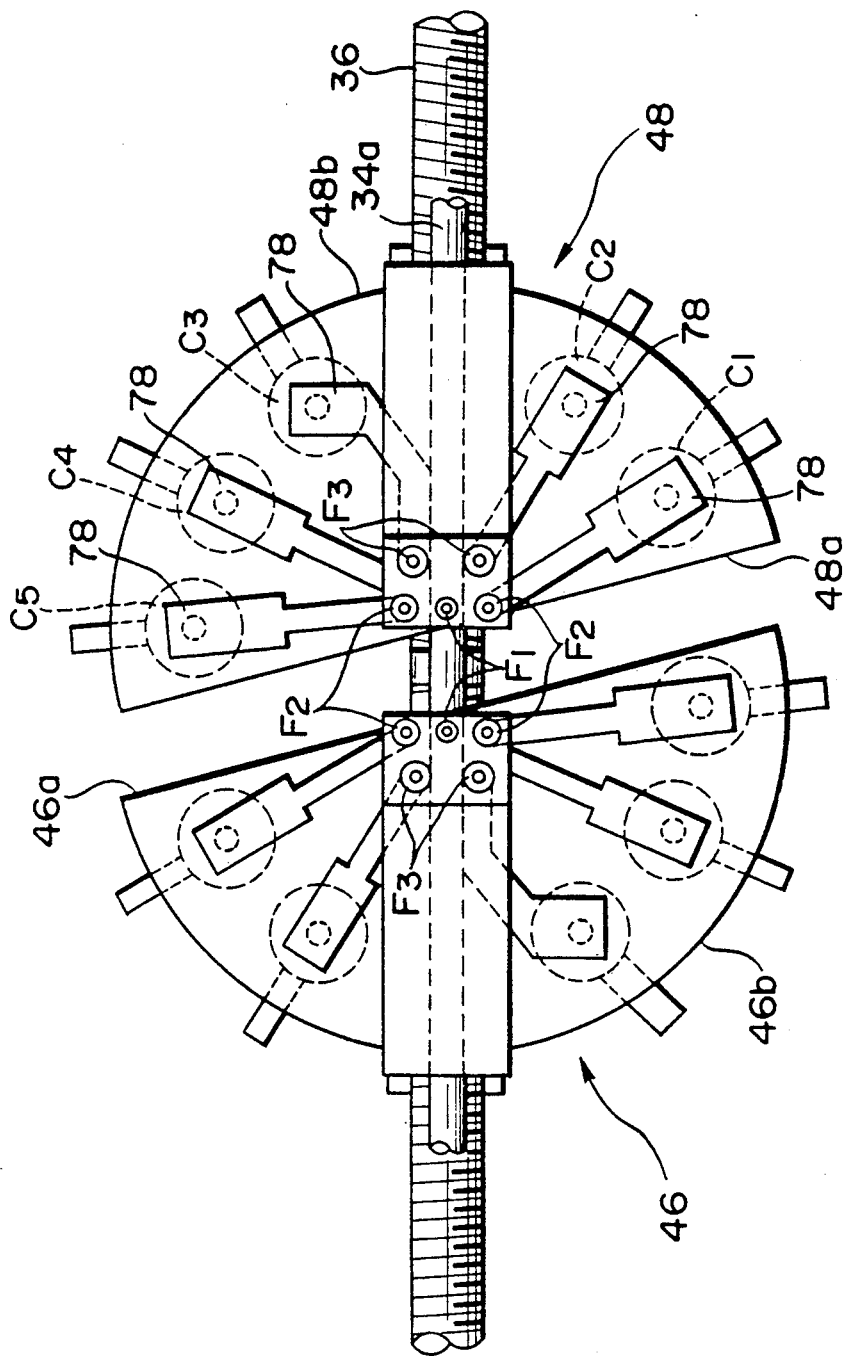
FIG. 4 is a bottom view showing a lower surface shape of the hand apparatus shown in FIG. 2.

FIG. 4 shows a lower surface shape of FIG. 2 in a state wherein the left and right cylinder casings 46 and 48 comprising the finger units with the above arrangement are assembled to the hand mounting portion 14 described above.

For the sake of descriptive convenience, FIG. 4 shows a state wherein the screw shaft 36 is pivoted clockwise so as to separate the left and right cylinder casings 46 and 48 from each other, so that their flat surface portions 46a and 48a are separated from each other. As can be seen from FIG. 4, the semi-cylindrical cylinder casings 46 and 48 have the flat surface portions 46a and 48a which are inclined at 15° from a vertical line depending from the intersection with the screw shaft 36. The five cylinders $C_n$ are arranged in these cylinder casings 46 and 48 at 30° angular intervals. In this case, the number of cylinders $C_n$ is divided into groups of three and two cylinders to have the screw shaft 36 as a center, so that these cylinders $C_n$ can be efficiently arranged on a concentrical arc.

The above-mentioned fingers $F_n$ are integrally connected to the cylinders $C_n$ with the above arrangement. These fingers $F_n$ have the above-mentioned functions (1), (2), and (3), respectively. In FIG. 4, the first finger $F_1$ coaxial with the screw shaft 36 has the function (1), a pair of second fingers $F_2$ located at two sides of the finger $F_1$ have the second function (2), and a pair of third fingers $F_3$ located outside the first finger $F_1$ along the screw shaft 36 and at two sides of the screw shaft 36 have the third function (3). In this manner, the fingers $F_n$ are slidably guided in the guide holes 56 formed in the right angle member 54 so that the coupling plates 78 fixed to the corresponding fingers $F_n$ do not interfere with each other.

Note that in FIG. 4, although the right cylinder casing 48 has been exemplified, the fingers $F_n$ are similarly provided in the left cylinder casing 46.

In the hand apparatus 10 with the above arrangement, all the fingers $F_n$ are symmetrically arranged, and in an operation described later, a pair of right and left fingers $F_n$ are basically used. However, one finger $F_n$ may sometimes be solely used.

The basic operation of the hand apparatus 10 with the above arrangement will be described below.

Figure 5A:
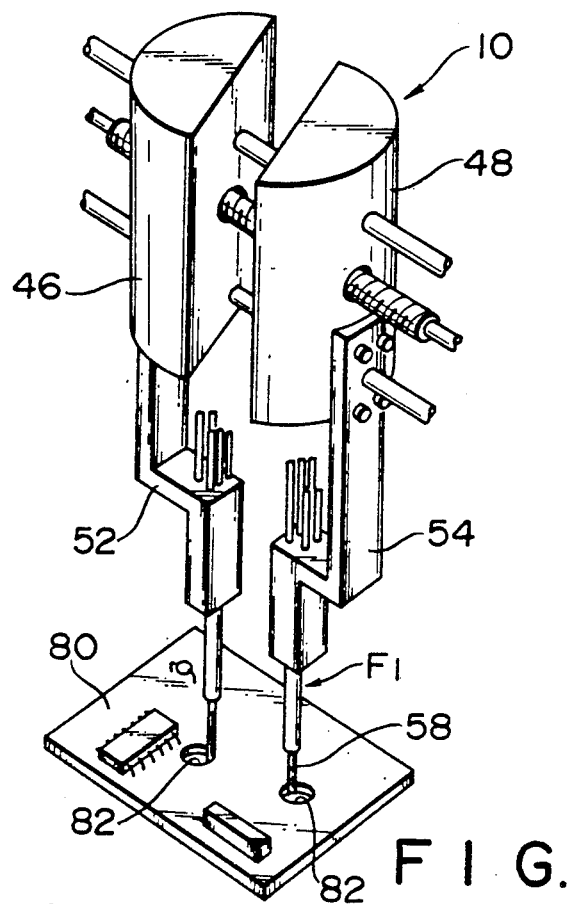
FIGS. 5A to 5C are perspective views showing examples of use of the hand apparatus shown in FIG. 2.

More specifically, a gripping state by the function (1) is illustrated in FIG. 5A. In FIG. 5A, the robot arm 12 moves the hand apparatus 10 to a position above a member 80 to be gripped. The left and right cylinder casings 46 and 48 are moved by the servo motor 40, so that the pins 58 constituting the first fingers $F_1$ of the hand apparatus 10 are located immediately above substantially the centers of a pair of holes 82 formed in the member 80 to be gripped. When the pins 58 are brought to positions immediately above the corresponding holes 82, a pneumatic pressure is supplied to the first cylinders $C_1$, and the first fingers $F_1$ are entirely moved downward. Thus, the pins 58 enter the central portions of the corresponding holes 82. The servo motor 40 is further operated while keeping this vertical positional relationship, thereby gripping the member 80 to be gripped by clamping the inner edges of the holes 82, as shown in FIG. 5A.

At this time, the robot arm 12 operates to advance to the next step, thus transferring the member 80 to be gripped. In this case, the member 80 to be gripped preferably has a planar shape like an electrical circuit board or a CCD sensor circuit board.

Since the function (2) of the fingers is substantially the same as the function (3) of the fingers, the function (3) will be explained below, and a description of the function (2) will be omitted.

Figure 5B:
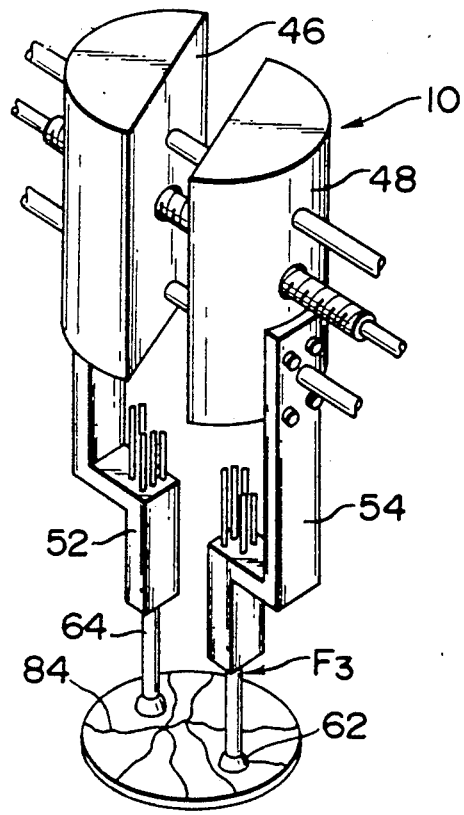

As shown in FIG. 5B, a member 84 to be chucked comprises an article whose shape and material do not allow easy gripping like an aperture mask of a camera. Thus, the third fingers $F_3$ of the hand apparatus 10 are moved to positions immediately above the member 84 to be chucked, and thereafter, an operation until the third fingers $F_3$ are moved downward to predetermined positions is performed in the same manner as in the operation of the function (1). With this operation, the suction pads 62 are brought into contact with the upper surface of the member 84 to be chucked. At this contact position, a vacuum pressure is supplied to the suction pads 62 through the vacuum tubes 30. As a result, the member 84 is chucked by the suction pad 62. At this time, the robot arm 12 operates to advance to the next step, thus transferring the member 84 to be chucked.

Figure 5C:
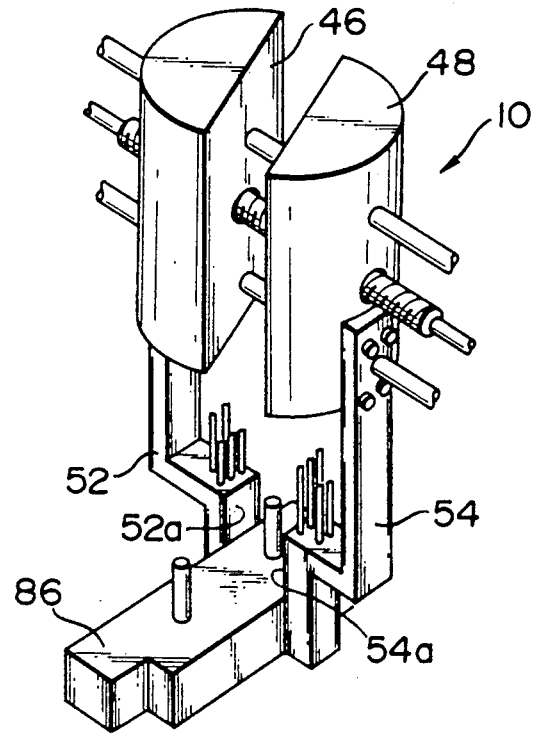

Finally, as shown in FIG. 5C, when a member 86 to be gripped has a relatively large volume and a large weight, the member 86 is clamped and gripped by the flat surfaces 52a and 54a of the left and right angle members 52 and 54.

The robot arm 12 advances to the next step while keeping this state, thus transferring the member 86 to be gripped.

Figure 6:
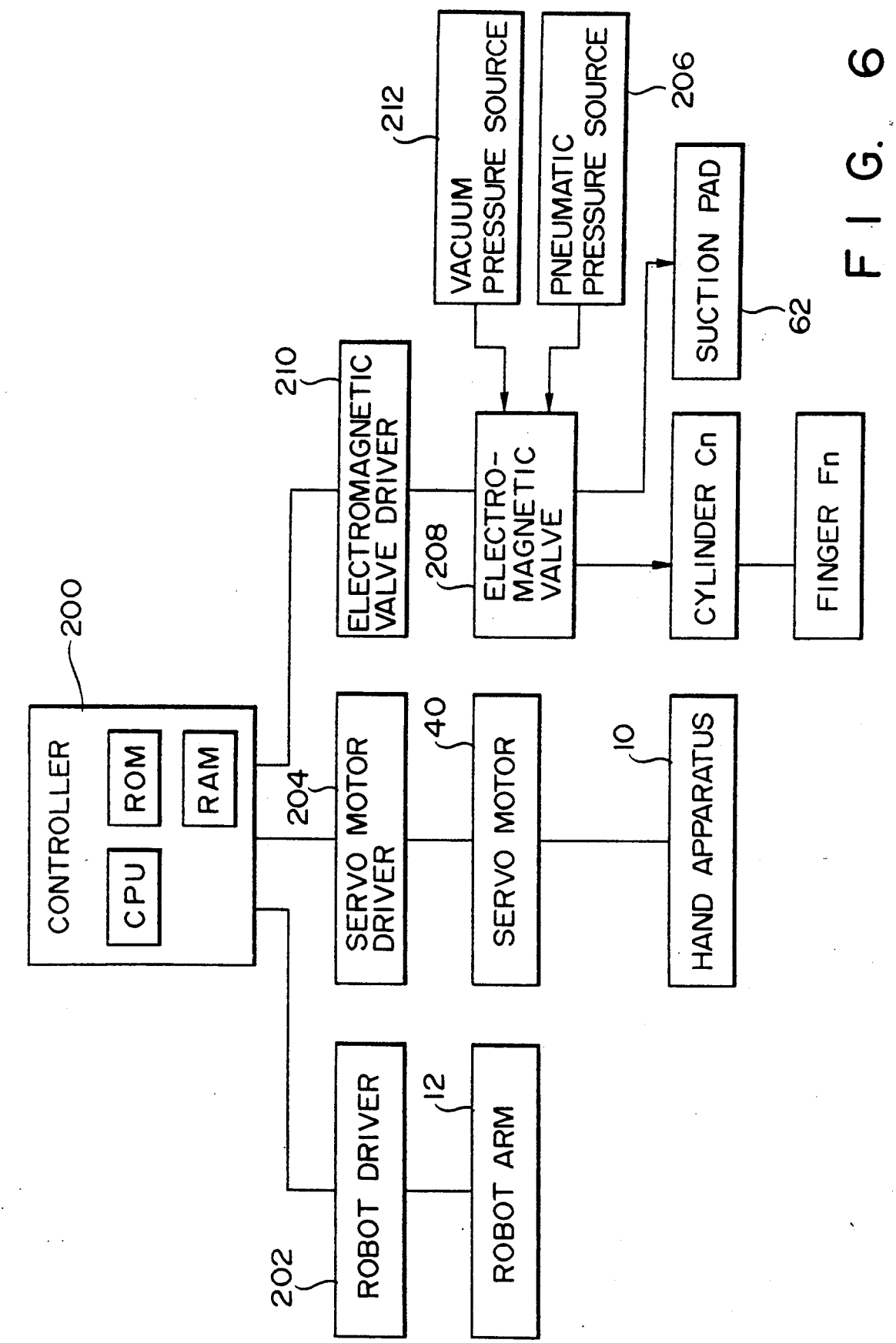
FIG. 6 is a block diagram showing elements of the embodiment.

FIG. 6 is a block diagram of a control system for controlling/driving the operation of the robot arm 12, the hand apparatus 10, the cylinders $C_n$, the fingers $F_n$, and the suction pads 62 as the components of the embodiment described above.

As shown in FIG. 6, the control system has a controller 200. The controller 200 incorporates a ROM storing a basic operation program, a RAM for storing a position data amount, and the like upon teaching of the robot, and a CPU for controlling the entire system. The controller 200 controls drivers as follows.

The control system further has a robot driver 202 for driving the robot arm 12, a servo motor driver 204 for driving the servo motor 40 equipped in the hand apparatus 10, an electromagnetic valve driver 210 for driving an electromagnetic valve 208 for supplying/shielding a pneumatic pressure supplied from a pneumatic pressure source 206 to the cylinders $C_n$ for operating the fingers $F_n$. The electromagnetic valve 208 also serves as an electromagnetic valve for supplying/shielding a vacuum pressure supplied from a vacuum pressure source 212 to the suction pads 62.

Figure 7:
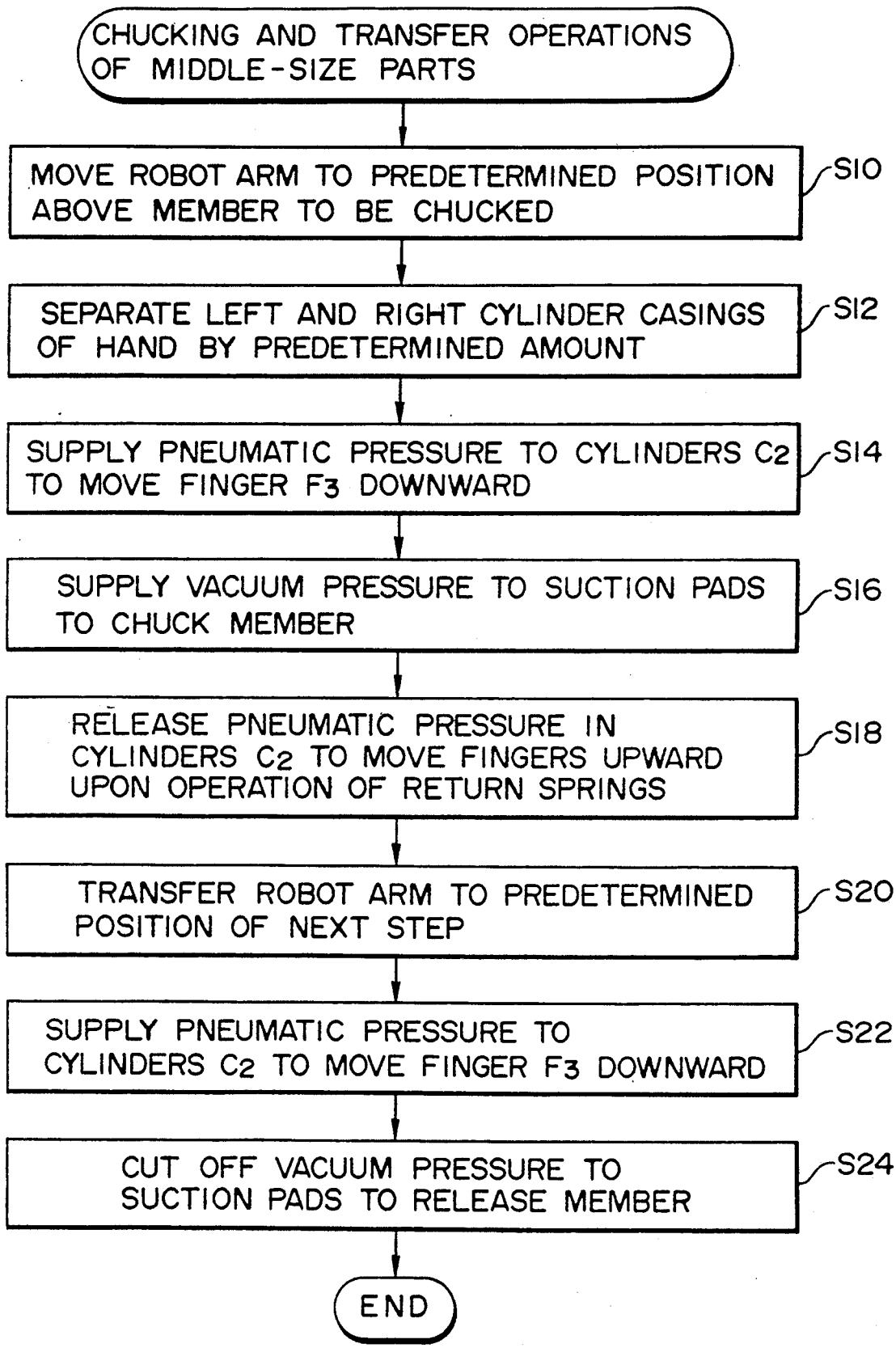
FIG. 7 is a flow chart showing an operation sequence of the block arrangement shown in FIG. 6.
Figure 8:
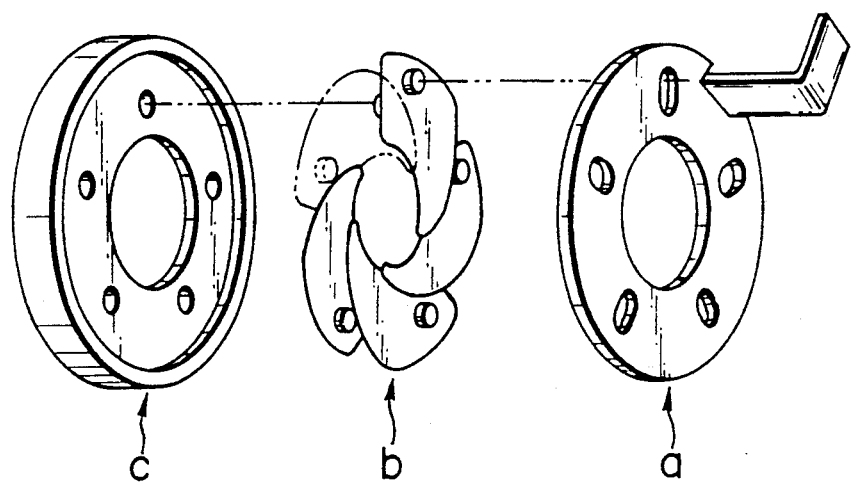
FIG. 8 is an exploded perspective view showing an arrangement of an aperture unit for which an assembly is made using a hand apparatus according to the present invention and a conventional hand apparatus.

In the function (3) described above, i.e., in the function of chucking middle-size parts, all the constituting elements shown in the block diagram of FIG. 6 are used. Thus, this operation will be described hereinafter with reference to the flow chart shown in FIG. 7.

More specifically, when chucking and transfer operations of a middle-size member 84 to be chucked are started, the robot arm 12 is moved to a predetermined position of the member 84 to be chucked in step S10. In step S12, the left and right cylinder casings 46 and 48 are separated to positions above the member 84 to be chucked by the suction pads 62 upon operation of the servo motor 40. The flow then advances to step S14, and the electromagnetic valve 208 connected to the pneumatic pressure source 206 is opened to supply a pneumatic pressure to the third cylinders $C_3$.

As a result, the third fingers $F_3$ are moved downward to the suction positions on the member 84 to be chucked. In step S16, the electromagnetic valve 208 for supplying a vacuum pressure to the suction pads 62 is opened, so that the suction pads 62 chuck the member 84 to be chucked. Thereafter, in step S18, the pneumatic pressure supplied to the cylinders $C_3$ (step S14) is released by opening a pneumatic pressure relief valve (not shown), and the pistons 68 are moved upward upon operation of the return springs 74. As a result, the fingers $F_3$ arranged integrally with the pistons 68 are moved upward while gripping the member 84 to be chucked.

In step S20, the robot arm 12 is moved to the predetermined position of the next step. In step S22, a pneumatic pressure is again supplied to the cylinders $C_3$, and the fingers $F_3$ are moved downward. Thereafter, in step S24, the vacuum pressure to the suction pads 62 is shielded. In this manner, an operation of releasing the member 84 to be chucked is performed, thus completing a series of chucking and transfer operations of the middle-size parts 84.

As described above, in the embodiment according to the present invention, at least the functions (1), (2), and (3), and a function of gripping a large-scale heavy article, i.e., a total of four functions can be performed by the single hand apparatus 10. Therefore, since a special-purpose hand need not be replaced in the robot arm every time a member to be gripped or an article to be chucked is altered unlike in a conventional apparatus, the cost of the apparatus can be reduced, and the preparation time required for hand replacement can be shortened.

In the hand apparatus 10 of this embodiment, piping of pneumatic and vacuum pressure supply systems can be readily performed by only one operation, the time required for mounting does not include piping, and the hand apparatus 10 can be attached to the robot arm 12 within a remarkably short time. This is an important feature considering checking and maintenance.

As described above, in the embodiment of an article holding hand apparatus according to the present invention, fingers comprising functions of gripping or chucking a plurality of types of articles having different shapes and weights can be effectively provided to the hand apparatus 10. As a result, a preparation process of replacing a hand apparatus for every mounting/replacing operation is unnecessary.

As many apparently widely different embodiments of the present invention can be made without departing from the spirit and scope thereof, it is to be understood that the invention is not limited to the specific embodiments thereof except as defined in the appended claims.

What is claimed is:

1. An article holding hand apparatus which grips a plurality of types of articles having different gripping modes, said apparatus comprising:
    at least two casings having a variable distance therebetween;
    first driving means for moving said casings to vary the distance therebetween;
    first holding means, attached to each of said casings, for holding a first article, said first holding means comprising at least two first finger members for opening and closing to clamp the first article upon movement of said casings by said first driving means;
    second holding means, attached to each of said casings, for holding a second article, said second holding means having second finger members disposed within said first finger members, and slidably guided by said first finger members, with one of said second finger members serving as a pin member capable of gripping a second article which is smaller than the first article, wherein each of said second finger members is formed of a hollow pipe, with one end of said hollow pipe having a suction portion for chucking the second article, and further comprising a suction drive source, connected to the other end of said hollow pipe, for creating a suction force in said suction portion of said hollow pipe; and
    second driving means, housed in said casings, for sliding said second finger members within said first members so as to protrude and retract therefrom.

2. An article holding hand apparatus which grips a plurality of types of articles having different gripping modes, said apparatus comprising:
    at least two casings having a variable distance therebetween;
    first driving means for moving said casings to vary the distance therebetween;
    first holding means, attached to each of said casings, for holding a first article, said first holding means comprising at least two first finger members for opening and closing to clamp the first article upon movement of said casings by said first driving means;
    second holding means, attached to each of said casings, for holding a second article, said second holding means having second finger members disposed within said first finger members, and slidably guided by said first finger members, with a distal end of said second finger members serving as a holding portion for holding the second article, wherein each of said second finger members is formed of a hollow pipe, with one end of said hollow pipe having a suction portion for chucking the second article, and further comprising a suction drive source, connected to the other end of said hollow pipe, for creating a suction force in said suction portion of said hollow pipe; and second driving means, housed in said casings, for sliding said second finger members within said first members so as to protrude and retract therefrom, wherein said second driving means comprises pneumatic cylinders, and said pneumatic cylinders and said hollow pipes are connected to each other through a relay member.

3. An article holding hand apparatus which grips a plurality of types of articles having different gripping modes, said apparatus comprising:

a pair of casings capable of moving toward and away from each other in a first vertical plane, each of said casings being formed into a semi-cylindrical shape and having a bottom surface, a flat surface disposed in a second vertical plane and a semi-cylindrically shaped surface, with said casings being disposed so that said flat surfaces oppose each other and forming a cylindrical shape when said flat surfaces abut each other;

first driving means for moving said casings toward and away from each other, including a drive shaft for driving said casings to abut said flat surfaces such that the second vertical plane is transverse but not perpendicular to the first vertical plane;

article holding means, connected to each said casing, for holding an article, said article holding means having a plurality of paris of finger members;

second driving means for moving and driving said finger members, said second driving means being disposed on said semi-cylindrically shaped surfaces and being radially arranged toward said flat surfaces in said casings; and coupling means for coupling said finger members and said second driving means, wherein said second driving means drives said finger members to protrude and retract from a holding position so as to change the position of the article.

4. An article holding hand apparatus which grips a plurality of types of articles having different gripping modes, said apparatus comprising:

a pair of casings arranged to be movable along a first axis;

first driving means for moving said casings toward and away from each other along the first axis;

first finger members, attached to said casings, for clamping and gripping a first article wherein said first finger members change a distance therebetween upon movement of said casings by said first driving means;

second finger members arranged to be movable along a second axis perpendicular to the first axis so as to protrude or retract from said first finger members for gripping a second article located below the first article, wherein said second finger members change a distance therebetween upon movement of said casings;

second driving means for moving said second finger members in order to grip the second article; and control means for controlling said first driving means to hold the first article by said first finger members and for controlling said first and second driving means to hold the second article in one or both of a first direction parallel with the first axis and a second direction perpendicular to the first axis by said second finger members.

5. An article holding hand apparatus which grips a plurality of types of articles having different gripping modes, said apparatus comprising:

at least two casings having a variable distance therebetween;

first holding means, attached to each of said casings, for holding a first article, said first holding means comprising at least two first finger members for opening and closing to clamp the first article upon movement of said casings by said first driving means;

second holding means, attached to each of said casings, for holding a second article, said second holding means having second finger members disposed within said first finger members, and slidably guided by said first finger members, with a distal end of said second finger members serving as a holding portion for holding the second article; and second driving means, housed in said casings, for sliding said second finger members within said first members so as to protrude and retract therefrom, wherein two first finger members are provided, and said plurality of second finger members are disposed within both of said first finger members, with said plurality of second finger members being disposed in pairs, with one member from each pair being disposed in one of said first finger members, and said pairs having different finger functions for holding an article in different ways, and said respective pairs of second finger members are selectively driven by said second driving means to hold an article using the appropriate finger function.

6. An article holding hand apparatus which includes first and second driving sources for selectively holding articles by a suctioning force and by a gripping force, comprising:

a pair of semi-cylindrical bodies each having a flat surface and a semi-cylindrical surface, with said bodies being disposed so that said flat surfaces face each other;

a guide member for guiding both semi-cylindrical bodies along a common axis;

a plurality of first driving means housed in each of said semi-cylindrical bodies, said plurality of first driving means being arranged radially along said semi-cylindrical surfaces in a circular pattern, and each of said first driving means being connected to said first driving source;

second driving means for moving said semi-cylindrical bodies toward and away from each other along said guide member; and hollow holding members attached to said semi-cylindrical bodies for holding articles with either one of said suctioning force and gripping force, said holding members being connected to said first and second driving sources and said first driving means, with said holding members being movable vertically by said first driving source, being able to hold the article with a suction force provided by said second driving source and being able to hold the article with a gripping force provided by said first driving means.

7. An article holding hand apparatus, comprising:
a plurality of pairs of holding members for holding various types of articles, with the number of said pairs being an odd number;
a plurality of first driving means for driving said plurality of holding members;
a pair of casings, each containing a plurality of said first driving means, with each casing being a hollow semi-cylindrical body having a flat surface and a semi-cylindrical surface, and said plurality of first driving means being radially arranged along said semi-cylindrical surfaces of said casings;
second driving means for driving said casings to move toward and away from each other; and
a guide member, having an extending axis, for guiding said casings as they move toward and away from each other, said guide member extending through both of said casings and dividing said casings into first and second sections, with said first section having an odd number of said first driving means and said second section having an even number of said first driving means.

8. The apparatus according to claim 7, wherein said flat surfaces of the casings are at an angle with respect to the extending axis of said guide member.

9. The apparatus according to claim 7, wherein said holding members are housed in a substantially central portion of said casings, and further comprising coupling members for coupling said holding members and first driving means, with said coupling members being arranged to extend radially around said casings.

10. An article holding hand apparatus, comprising:
first, second and third driving means for driving a plurality of holding members;
a pair of first holding members for holding a first article with a gripping force provided by said first driving means, said pair of first holding members clamping said first article by moving toward each other by said first driving means;
second holding members for holding a second article using a suction force provided by said second driving means;
third holding members, having finger members, for holding the articles by inserting said finger members through holes formed in a third article using an insertion force provided by said third driving means; and
control means for controlling said first driving means to engage and hold the third article at a position where the third holding members are inserted into holes in the third article.

* * * * *

UNITED STATES PATENT AND TRADEMARK OFFICE
CERTIFICATE OF CORRECTION

PATENT NO.  : 5,050,919
DATED       : September 24, 1991
INVENTOR(S) : Yakuo

It is certified that error appears in the above-identified patent and that said Letters Patent is hereby corrected as shown below:

On the Title page, item

[56] REFERENCES CITED:

FOREIGN PATENT DOCUMENT, "62-181839 8/1962" should read --62-181839 8/1987--; and "46-46819 2/1973" should read --48-46819 2/1973--.

COLUMN 11:

Line 38, "paris" should read --pairs--.

Signed and Sealed this

Fourth Day of May, 1993

*Attest:*

MICHAEL K. KIRK

*Attesting Officer*   Acting Commissioner of Patents and Trademarks